United States Patent [19]

Gola et al.

[11] Patent Number: 4,988,768

[45] Date of Patent: Jan. 29, 1991

[54] POLYVINYL CHLORIDE PLASTISOL BASED CURABLE COMPOSITION

[75] Inventors: Edward F. Gola, Allison Park, Pa.; Umesh C. Desai, Troy, Mich.

[73] Assignee: PPG Industries, Inc., Pittsburgh, Pa.

[21] Appl. No.: 290,328

[22] Filed: Dec. 27, 1988

[51] Int. Cl.$^5$ .......................... C08K 5/12; C08K 27/06; C08K 47/00

[52] U.S. Cl. .................................... 525/195; 525/194; 525/262; 525/263; 525/208; 525/297

[58] Field of Search ............... 525/195, 193, 194, 208, 525/7 H, 83, 91, 262, 263

[56] References Cited

U.S. PATENT DOCUMENTS

| | | | |
|---|---|---|---|
| 3,551,472 | 12/1970 | Siebert | 260/465.4 |
| 4,020,966 | 5/1977 | Wazolek | 523/100 |
| 4,259,460 | 3/1981 | Schwarz | 525/208 |
| 4,289,818 | 9/1981 | Casamayor | 428/43 |
| 4,537,805 | 8/1985 | Lin | 525/305 |
| 4,617,454 | 10/1986 | Greenhalgh | 219/505 |

*Primary Examiner*—Allan M. Lieberman
*Attorney, Agent, or Firm*—Linda Pingitore

[57] ABSTRACT

A curable composition contains:
(a) a vinyl chloride plastisol,
(b) a diene acrylonitrile copolymer containing activated vinyl groups which are capable of undergoing free radical initiated polymerization carried out either by use of heat or ultraviolet light or electron beam in the presence of a free radical initiator and organometallic accelerator combination, and
(c) an organometallic accelerator and free radical initiator combination adapted to promote cure of the fusing plastisol composition. The curable composition is characterized in that for every 100 parts of vinyl chloride plastisol there are present from about 9 parts to about 16 parts of diene acrylonitrile copolymer containing activated vinyl groups.

The curable composition is especially suitable for use as an adhesive or sealant.

9 Claims, No Drawings

POLYVINYL CHLORIDE PLASTISOL BASED CURABLE COMPOSITION

BACKGROUND OF THE INVENTION

The present invention relates to polyvinyl chloride plastisol-based curable compositions.

In the manufacture of automobiles, the automobile body is initially primed with a coating composition to prevent corrosion of the metal. This can be done in a number of ways although generally it is performed by cationic electrodeposition using the auto body as the cathode. Once the automobile body has been primed in this manner, subsequent steps in the assembly are carried out. These steps typically include the use of sealants over the primed automobile body. The sealants are subsequently topcoated along with the remainder of the body during the final stages of the painting process.

A common and inexpensive variety of sealant which is utilized in automobile manufacture is the polyvinyl chloride plastisol-based sealant. These sealants generally require the addition of some type of adhesion promoter in order to achieve optimum adhesion to the primed metal auto body. Historically, polyaminoamides have been utilized in plastisol-based sealants as adhesion promotors for the composition. These adhesion promotors, however, have certain disadvantages associated with them. In particular, the polyaminoamides interfere with the acid catalyzed cure of the automobile topcoat and also they contribute to bleed-through yellowing of the automobile topcoat.

There is a need, therefore, for a polyvinyl chloride plastisol-based curable composition which has excellent adhesion to primed metal and also is capable of being topcoated with a variety of coating compositions without yellowing of the topcoat.

SUMMARY OF THE INVENTION

In accordance with the present invention, there is provided a curable composition comprising: (a) a polyvinyl chloride plastisol, (b) a diene acrylonitrile copolymer containing activated vinyl groups which are capable of undergoing free radical initiated polymerization carried out either by use of heat or ultraviolet light or electron beam in the presence of a free radical initiator and organometallic accelerator combination and (c) an organometallic accelerator and free-radical initiator combination adapted to promote cure of the fusing plastisol composition the organometallic accelerator being present in an amount ranging from about 0.1 percent to about 1.5 percent and the free radical initiator being present in an amount ranging from about 0.15 percent to about 1.5 percent, the percentages based on the total weight of the composition. The curable composition is characterized in that for every 100 parts of vinyl chloride plastisol there are present from about 9 parts to about 16 parts of diene acrylonitrile copolymer containing activated vinyl groups.

DETAILED DESCRIPTION OF THE INVENTION

The curable composition of the present invention comprises as one of its principal components a polyvinyl chloride plastisol. A plastisol is a dispersion of polyvinyl chloride resin in a liquid plasticizer to produce a fluid matrix which may range in viscosity from pourable liquid to a heavy paste. The polyvinyl chloride homopolymers or copolymers are typically produced by emulsion polymerization. Once the polymer is produced and dried, it is dispersed in plasticizer. The choice of plasticizer depends upon many factors including the desired solids viscosity relationship, processing characteristics and the ultimate desired performance properties. Suitable plasticizers include didecyl phthalate, diisodecyl phthalate, diisononyl phthalate, trimethyl pentanediol isobutyrate, sucrose benzoate, butyl cyclohexyl phthalate, butyl octyl phthalate, isooctyl epoxystearate, dipropylene glycol dibenzoate, di-2-ethylhexyl adipate, diisodecyl adipate, diisodecyl gluterate, dioctyl sebacate and mixtures thereof. Also suitable for use alone or in admixture with the monopolymeric plasticizers are polymeric plasticizers including polymeric benzoates, polymeric adipates, polymeric glutarates, polymeric sebacates, polymeric phthalates and mixtures thereof.

Although a brief description of the preparation of vinyl chloride plastisols has been given above, it should be understood that the preparation of these materials is well appreciated by those skilled in the art and further details are not required for practice of the present invention. If further details are desired, the following references provide a detailed description of the preparation of vinyl chloride plastisols which are suitable for use in the present invention: *Plastisols and Organosols*, edited by Harold A. Sarvetnick, published by Van Nostrand Reinhold, 1972 and "PVC: Formulation, Compounds and Processing, A Review and Update", reprint of the Society of Plastic Engineers, 1981.

The second principle component of the claimed curable compositions is a diene acrylonitrile copolymer containing activated vinyl groups. An activated vinyl group as used herein means a vinyl group which is capable of undergoing free-radical initiated polymerization carried out either by use of heat or ultraviolet light or electron beam in the presence of a free radical initiator and organometallic accelerator combination. A variety of diene acrylonitrile copolymers can be utilized so long as the copolymer contains an activated vinyl group. Suitable dienes which can be copolymerized with acrylonitrile include polymers of 1,3-dienes containing from 4 to 12 and preferably from 4 to 6 carbon atoms. Typical dienes include 1,3-butadiene which is preferred, 2,3-dimethyl- 1,3-butadiene, isoprene, chloroprene and piperylene. Other polymerizable monomers such as methyl methacrylate, acrylic acid, and styrene can also be utilized. A particularly preferred material is vinyl-terminated butadiene acrylonitrile copolymer which is commercially available from B. F. Goodrich as HYCAR 1300×23. Also suitable are HYCAR 1300×33 and HYCAR E700 2E also from B. F. Goodrich. In addition, vinyl-terminated butadiene acrylonitrile copolymers which are adducts of carboxy-terminated butadiene acrylonitrile copolymer and an epoxy containing vinyl monomer such as glycidyl acrylate or glycidyl methacrylate are suitable for use as the activated vinyl group containing component.

The claimed curable composition additionally comprises an organometallic accelerator and free-radical initiator combination which is adapted to promote cure of the activated vinyl groups of the diene acrylonitrile copolymer of the composition. It should be understood that fusion of the vinyl chloride plastisol and cure of the activated vinyl groups proceeds together in situ. It is theorized that the accelerator and initiator combination also promotes adhesion of the curable composition.

The organometallic accelerator of the accelerator and initiator combination can be chosen from several materials including organo soaps of cerium, cobalt, manganese, rare earth and mixtures of these. This list is not intended to be limiting since a variety of materials are contemplated so long as they are capable of working in conjunction with an appropriate free-radical initiator at the desired cure temperature to promote cure of the fusing composition. Suitable materials are commercially available from Nuodex, Inc. It has been observed that some organometallic accelerators such as calcium, although they are not preferred for use alone, can be combined with one of the aforelisted materials to achieve the requisite cure. In a preferred embodiment of the present invention, the organometallic accelerator is a combination of calcium and rare earth. The organometallic accelerator is generally utilized in the curable composition in an amount ranging from about 0.1 percent to about 1.5 percent, preferably from about 0.2 percent to about 1 percent, the percentages based on the total weight of the composition.

The free-radical initiator of the accelerator and initiator combination can be chosen from a wide variety of materials so long as the initiator is suitable for use at the desired cure temperature. A preferred group of initiators for use herein are peroxide-type initiators such as dialkyl peroxides, acyl peroxides, peresters, and peroxy carbonates. Examples of these types of materials include t-butyl perbenzoate; dicumyl peroxide, t-amyl perbenzoate, 2,5-dimethyl 2,5-bis(benzoyl peroxy)hexane, oo-t-butyl o-isopropyl monoperoxycarbonate and di-tert butyl peroxide.

Particularly preferred of the peroxide-type initiators are the peroxy ketals such as for example 1,1-di(tert-butylperoxy)3,3,5 -trimethyl cyclohexane; 1,1 -di(tert-butylperoxy)cyclohexane and 1,1-di(tert-amyl peroxy) cyclohexane. The free-radical initiator is generally utilized in the curable composition in an amount ranging from about 0.15 percent to about 1.5 percent, preferably from about 0.2 percent to about 1 percent, the percentages based on the total weight of the composition.

It should be understood that the choice of accelerator and initiator depends upon the particular choice of diene acrylonitrile copolymer containing activated vinyl groups and the desired cure temperature. As is appreciated by those skilled in the art, a vast array of free-radical initiators are available, each being optimally effective within a particular temperature range. An inappropriate choice of initiator for a particular cure temperature can result in sluggish or incomplete cure and concomitant loss of adhesion in the resultant cured product.

The curable compositions of the claimed invention can also contain other resinous ingredients so long as they do not detract from the properties of the final composition. Examples of such resinous additives include an adduct of carboxy-terminated polybutadiene acrylonitrile copolymer and a diglycidyl ether of bisphenol A such as EPON 828 (commercially available from Shell Chemical); and a copolymer of polyvinyl chloride and polyvinyl acetate, which is preferred.

The claimed curable compositions can also contain a variety of well-known and conventionally utilized additives, including fillers such as carbon black and bentonite clay, plasticizers, adhesion promoters, stabilizers for the vinyl chloride polymer and antioxidants for the other polymer components. The compositions are generally prepared by simply combining the various ingredients with agitation.

The claimed curable compositions are particularly suitable for use as adhesives and sealants, preferably sealants, over primed metal. They can also be utilized over other substrates including cold rolled steel, zincrometal and galvanized metal. The curable compositions are generally fused and cured by baking at a temperature of from about 115° C. to about 185° C., preferably from about 115° C. to about 155° C. The time required for cure and fusion of the composition generally ranges from about 15 minutes to about 60 minutes, preferably from about 30 minutes to about 40 minutes.

The claimed curable compositions are particularly advantageous in that they have excellent adhesion to primed metal substrates and in addition can be topcoated with a variety of coating compositions without yellowing of the topcoat. The claimed compositions also exhibit good tensile strength and elongation, good reverse impact resistance at low temperatures, e.g., −20° C. and good adhesion after condensing humidity exposure.

The following examples are illustrative of the invention and are not intended to be limiting.

EXAMPLE I

This Example illustrates the preparation of several polyvinyl chloride plastisol based sealants according to the present invention.

| Ingredients | Parts by Weight (grams) Compositions | | | | | | |
|---|---|---|---|---|---|---|---|
| | 1 | 2 | 3 | 4 | 5 | 6 | Control |
| NUOPLAZ 1046[1] | 35 | 35 | 35 | 35 | 35 | 35 | 35 |
| DINP[2] | 16 | 16 | 16 | 16 | 16 | 16 | 16 |
| epoxy adduct[3] | 3 | — | — | 3 | 3 | 3 | — |
| vinyl terminated butadiene/ acrylonitrile copolymer[4] | 4 | 5 | 7 | 4 | 4 | 4 | — |
| IONOL solution[5] | 2 | 2 | 2 | 2 | 2 | 2 | 2 |
| tertiary-butyl perbenzoate | 1 | 1 | 1 | — | — | 0.5 | — |
| LUPERSOL 331-80 B[6] | — | — | — | 2 | — | 2 | — |
| cerium metal catalyst | 2 | 2 | 2 | 2 | 2 | 2 | — |
| VESTOLIT 7012[7] | 30 | 30 | 30 | 30 | 30 | 30 | 30 |
| FPC 481[8] | 12 | 14 | 12 | 12 | 12 | 12 | 12 |
| mica | 5 | 5 | 5 | 5 | 5 | 5 | 5 |
| WINNOFIL SP[9] | 35 | 35 | 35 | 35 | 35 | 35 | 35 |

-continued

| | Parts by Weight (grams) Compositions | | | | | | |
|---|---|---|---|---|---|---|---|
| Ingredients | 1 | 2 | 3 | 4 | 5 | 6 | Control |
| TRIGONOX 29B75[10] | — | — | — | — | 2 | — | — |

[1] Isobutyrate polyester plasticizer which is commercially available from Nuodex, Inc.
[2] Diisononylphthalate plasticizer which is commercially available from Exxon Chemical.
[3] This adduct was prepared from EPON 828 from Shell Chemical and carboxy terminated acrylonitrile butadiene copolymer from B. F. Goodrich in the following manner: Into a reactor vessel equipped with nitrogen blanket, stirrer, thermometer and condenser was charged 60 parts by weight of EPON 828. To this stirred EPON 828, 40 parts by weight of carboxy terminated butadiene acrylonitrile copolymer was added and the mixture was heated to 320° F. (160° C.). The acid value of the mixture was monitored at 20 minute intervals and when the acid value obtained was below 0.1 the reaction was considered complete. After two hours of heating the acid value of the product was 0.04. The product was cooled to 170° F. to 200° F. (77° C. to 93° C.) and filled out. The viscosity of the product resin was 178,000 centipoise.
[4] This is commercially available from B. F. Goodrich as HYCAR 1300 X 23.
[5] This is an 8 percent solution of IONOL (which is commercially available from Shell Chemical Company) in isodecylmethacrylate. IONOL is the Shell trademark for 2,6-ditert-butyl-4-methyl phenol.
[6] Peroxyketal initiator which is commercially available from Pennwalt Corp. and is 1,1-di(t-butyl-peroxy) cyclohexane.
[7] Dispersion homopolymer of vinyl chloride commercially available from Chemische Werke Huls A. G.
[8] Polyvinyl chloride solution resin commercially available from Occidental Chemical Corporation.
[9] Stearate treated calcium carbonate which is commercially available from ICI.
[10] Peroxyketal initiator which is commercially available from Noury Chemical and is 1,1-di(tert-butylperoxy) 3,3,5-trimethylcyclohexane.

The aforelisted ingredients were combined with agitation to prepare the sealant compositions. Each of the sealants was evaluated for adhesion to a primed metal substrate as well as adhesion to a topcoating composition applied wet-on-wet over the sealant.

Each of the sealants was applied to metal panels which had been primed with cationically electrodepositable primer coating composition commercially available from PPG Industries, Inc. as ED 3150 W (UNI-PRIME ® coating composition). Each of the sealant coated panels was baked according to the following schedule and rated for adhesion from 0 (excellent adhesion) to 5 (no adhesion).

| | Composition Ratings | | | | | | |
|---|---|---|---|---|---|---|---|
| | 1 | 2 | 3 | 4 | 5 | 6 | Control |
| 30 minutes at 250° F. (121° C.) | 1 | 1 | 1 | 4 | 5 | 1 | 5 |
| 2 bakes @ 30 minutes at 250° F. (121° C.) | 1 | 0.5 | 0.5 | 1 | 1 | 1.5 | 5 |
| 30 minutes at 275° F. (135° C.) | 0.5 | 0.5 | 0.5 | 0.5 | 0.5 | 0.5 | 5 |
| 30 minutes at 305° F. (152° C.) | 0.5 | 0.5 | 1 | 0.5 | 1 | 1 | 4 |

The control was rated as having poor adhesion to the primed metal substrate and was not considered for the topcoat evaluation described below.

In a further evaluation for topcoat adhesion the sealant compositions were applied to primed panels as indicated above and then coated wet-on-wet first with a pigmented coating composition and then with a clear coating composition commercially avaiable from PPG Industries, Inc. as HUBC 90270. The panels were baked as indicated below and rated as follows for adhesion, paint run-off and black lining, topcoat yellowing and topcoat darkening. As the data below shows, the compositions exhibited good adhesion without yellowing.

| | Compositions | | | | | |
|---|---|---|---|---|---|---|
| | 1 | 2 | 3 | 4 | 5 | 6 |
| 2 bakes @ 30 minutes at 250° F. (121° C.) | | | | | | |
| adhesion: | 0.8 | 0.8 | 0.8 | 0.8 | 0.8 | 0.8 |
| comments: | $P_2;D$ | $P_2;D$ | $P_1;D$ | $P_2;D$ | $P_2;D$ | $P_2;D$ |
| 30 minutes at 275° F. (135° C.) | | | | | | |
| adhesion: | 0.5 | 0.5 | 0.5 | 0.5 | 0.5 | 0.5 |
| comments: | $P_2;D$ | $P_2;D$ | $P_1;D$ | $P_2;D$ | $P_2;D$ | $P_2;D$ |
| 30 minutes at 305° F. (152° C.) | | | | | | |
| adhesion: | 0.5 | 0.5 | 0.5 | 0.5 | 0.5 | 0.5 |
| comments: | $P_2;D$ | $P_4;D$ | $P_5;D$ | $P_2;D$ | $P_2;D$ | $P_2;D$ | adhesion: 0 (excellent) to 5 (no adhesion)
paint run-off and black lining:
$P_0$ (none observed) to $P_5$ (excessive amount)
Y: topcoat yellowing
D: topcoat darkening Each of the sealant compositions was also evaluated for the number of days of stability of 95° F. (35° C.).

| Composition | Days of Stability |
|---|---|
| #1 | 3 |
| #2 | 3 |
| #3 | 3 |
| #4 | 45 |
| #5 | 45 |
| #6 | 2 |

What is claimed is:
1. A curable composition comprising:

(a) a vinyl chloride plastisol,
(b) a diene acrylonitrile copolymer, containing activated vinyl groups which are capable of undergoing free radical intiated polymerization carried out either by use of heat or ultraviolet light or electron beam in the presence of a free radical initiator and organometallic accelerator combination, and
(c) an organometallic accelerator and free-radical initiator combination adapted to promote cure of the fusing plastisol composition, the organometallic accelerator being present in an amount ranging from about 0.1 percent to about 1.5 percent and the free radical initiator being present in an amount ranging from about 0.15 percent to about 1.5 percent, the percentages based on the total weight of the composition, with the proviso that for every 100 parts of vinyl chloride plastisol there are present from about 9 parts to about 16 parts of diene acrylonitrile copolymer containing activated vinyl groups.

2. The curable composition of claim 1 wherein (b) is a vinyl terminated butadiene acrylonitrile copolymer.

3. The curable composition of claim 1 where (b) is an adduct prepared from a carboxyl terminated butadiene acrylonitrile copolymer and an epoxy containing vinyl monomer.

4. The curable composition of claim 3 wherein the epoxy containing vinyl monomer is glycidyl acrylate or glycidyl methacrylate.

5. The curable composition of claim 1 wherein the accelerator of the accelerator and initiator combination is selected from the group consisting of an organosoap of cerium, cobalt, manganese, rare earth and mixtures thereof.

6. The curable composition of claim 5 wherein the accelerator is an organosoap of cerium.

7. The curable composition of claim 1 wherein the accelerator is a combination of calcium and rare earth.

8. The curable composition of claim 1 wherein the initiator of the accelerator and initiator combination is a peroxide type of free-radical initiator.

9. The curable composition of claim 8 wherein the initiator is a peroxy ketal.

* * * * *

UNITED STATES PATENT AND TRADEMARK OFFICE
CERTIFICATE OF CORRECTION

PATENT NO. : 4,988,768
DATED : January 29, 1991
INVENTOR(S) : Edward F. Gola and Umesh C. Desai It is certified that error appears in the above-identified patent and that said Letters Patent is hereby corrected as shown below:

On line 11 of the Abstract, first page, second column, after "plastisol composition", insert --the organometallic accelerator being present in an amount ranging from about 1.0 percent to about 1.5 percent and the free radical initiator being present in an amount ranging from about 0.15 percent to about 1.5 percent, the percentages based on the total weight of the composition.--

Signed and Sealed this

Seventeenth Day of August, 1993

*Attest:*

BRUCE LEHMAN

*Attesting Officer*   Commissioner of Patents and Trademarks